United States Patent

[11] 3,597,735

[72] Inventors Keizo Nakayama
Hitachi-shi;
Yutaka Ohno, Tokyo, both of, Japan
[21] Appl. No. 795,094
[22] Filed Jan. 29, 1969
[45] Patented Aug. 3, 1971
[73] Assignees Hitachi, Ltd
Tokyo, Japan;
Yutaka Ohno
Tokyo, Japan
[32] Priority Feb. 2, 1968
[33] Japan
[31] 43/6011

[54] CARRIER PILOT RELAYING SYSTEM
14 Claims, 5 Drawing Figs.
[52] U.S. Cl. .................................................. 340/149,
307/87, 317/27, 343/225
[51] Int. Cl. ........................................................ H02h 3/28,
H02h 7/26
[50] Field of Search .......................................... 317/27;
340/203, 207, 209, 149, 177, 170, 172; 307/87;
323/105; 235/151.21; 343/225

[56] References Cited
UNITED STATES PATENTS
2,832,827 4/1958 Metzger ....................... 340/147 CPO
2,845,613 7/1958 Pawley ........................ 340/207 X
3,177,478 4/1965 Hansel et al. ................ 340/178 X
3,223,889 12/1965 Schweitzer, Jr. ............. 340/177 UX
3,413,523 11/1968 Hoel ............................ 317/27

Primary Examiner—Donald J. Yusko
Attorney—Craig, Antonelli & Hill

ABSTRACT: A carrier pilot relaying system in which the current flowing through the power transmission line in each electrical station is detected by a current transformer to be converted into a phase signal and a digital signal representing the magnitude (scalar quantity) of the current, these signals being transmitted from one station to another station in the form of a train of pulse signals. In each station, detection of the phase difference between the phase signals and detection of the difference between the magnitude of the currents are carried out independently of each other so that a circuit breaker can be tripped when a predetermined condition is satisfied.

CARRIER PILOT RELAYING SYSTEM

BACKGROUND OF THE INVENTION

1. Field of the Invention

This invention relates to a novel carrier pilot relaying system based on the pulse code modulation system.

2. Description of the Prior Art

A carrier pilot relaying system (which will hereinafter be referred to as a carrier relay for the sake of simplicity) is frequently employed in a power transmission line, for the purpose of providing means for intercommunication of the direction or phase of current. However, when a zero-phase-sequence circulating current exists in a power transmission line, as pointed out in a publication such as, for example, Japanese Pat. No. 463,908, mere intercommunication of the direction or phase of current with each other in such a system is not satisfactory for accurate discrimination of internal faults from external faults. Further, in the case of a series-capacitor-compensated power transmission line, the discharge taking place in the protective gap of the capacitor is variable depending on the magnitude of current appearing as a result of a fault. Therefore, when the fault is not of a simple nature, mere comparison between the directions or phases of currents cannot give accurate discrimination of internal fault from external fault.

In order to deal with such a case, there is provided a pilot relaying system such as a pilot wire relay which is responsive to the difference between currents at individual electrical stations. It is economically difficult to apply the pilot wire relay to a power transmission line of a medium or a greater distance, and it is in strong demand to employ a carrier relay which is responsive to the difference between currents at individual electrical stations.

While the invention disclosed in Japanese Pat. No. 463,908 attained the above-described object substantially, the invention disclosed therein has not been satisfactory in the operating speed of the system, when employed for a directly grounded power transmission line, because the relay, which compares individual actual currents with a setting value varying with time, necessarily requires a long time for operation.

On the other hand, it is known that an AC waveform can be transmitted and reproduced with high fidelity by means of the pulse code modulation system as in the art of data communication. Therefore, the pulse code modulation system may be employed to transmit and reproduce current waveform for the sake of comparison thereby to obtain a differential current characteristic similar to that obtained with the pilot wire relay. However, as is well known, a data transmission link having a very high signaling rate in the order of several tens of thousands of bauds is required in order to transmit an AC waveform with high fidelity. Thus, its realization has been considered difficult as a matter of fact.

SUMMARY OF THE INVENTION

It is therefore a primary object of the present invention to provide a practicable carrier relay based on the pulse code modulation system in which a current is represented by a scalar quantity signal and a phase signal, both being transmitted, respectively.

DESCRIPTION OF THE PREFERRED EMBODIMENTS

Figure 2:
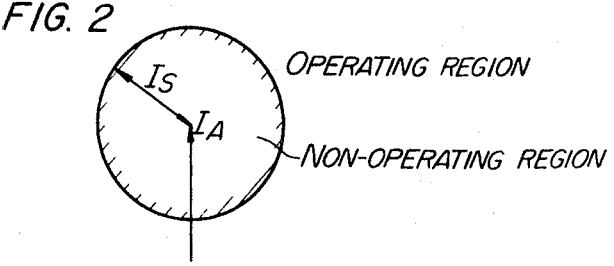
FIG. 2 is a diagram illustrating the operating characteristic of a conventional pilot wire relay.

Referring to FIG. 2 showing a single-line diagram for the illustration of the operation of a protective relay for a power transmission line L, electrical stations A and B are connected with respective back power sources $G^A$ and $G_B$. Suppose that a current $I_A$ flows into the power transmission line L from the electrical station A and a current $I_B$ flows through the power transmission line L toward the electrical station B. Then, the relation $\dot{I}_A = \dot{I}_B$ holds when no fault occurs in the system or when a fault occurs at, for example, a point $F_2$ which lies outside of the section between the electrical stations A and B. On the other hand, the relation $\dot{I}_A \neq \dot{I}_B$ holds when a fault occurs at, for example, a point $F_1$ which lies in the section between the electrical stations A and B. The above fact can be utilized to determine the location of the fault so that a protective relay is energized wherever necessary thereby to supply a tripping instruction to a circuit breaker (not shown).

A pilot wire relay is adapted to vectorially compare the terminal current $\dot{I}_A$ with the terminal current $\dot{I}_B$ in the power transmission line to be protected, and therefore the operating condition of the pilot wire relay will be as shown in FIG. 2. Taking $\dot{I}_A$ as reference, the pilot wire relay operates when $\dot{I}_B$ lies outside of a circle which is drawn about the tip of the vector $\dot{I}_A$ by a radius $I_S$ (setting value), that is, when the vector difference between $\dot{I}_A$ and $\dot{I}_B$ exceeds a predetermined limit. Thus, the operation of the pilot wire relay is indifferent to the presence or absence of a zero-phase-sequence circulating current or series capacitor. While this characteristic can also be obtained with a carrier relay when the pulse code modulation system is employed for the transmission and reproduction of the waveform with high fidelity, its practice is very difficult in view of the fact that a communication link of a very high signaling rate is required as described above.

In accordance with the present invention, the scalar quantities such as absolute values, effective values or means values of $\dot{I}_A$ and $\dot{I}_B$ are solely transmitted by the pulse code modulation system for the sake of comparison therebetween, and the system is also equipped with the function of the carrier relay of the known phase comparison type so as to realize a carrier pilot relaying system having the desired characteristic.

Figure 1:
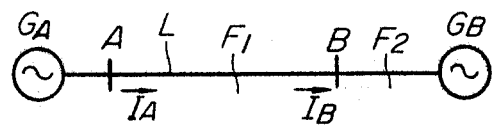
FIG. 1 is a single-line diagram for illustrating the operation of a protective relay for a power transmission line.
Figure 3:
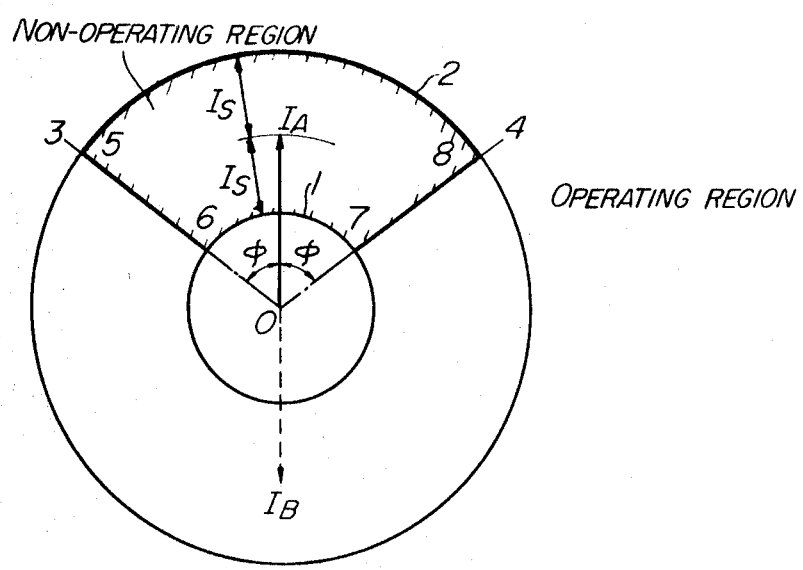
FIG. 3 is a diagram illustrating the operating characteristic of the system according to the present invention.

Referring to FIG. 3, the currents $\dot{I}_A$ and $\dot{I}_B$ in the form of a scalar quantity are compared with each other. When a circle 1 having a radius $\dot{I}_A - I_S$ ($I_S$ is the setting value) and a circle 2 having a radius $\dot{I}_A + I_S$ are drawn, the region defined between the circles 1 and 2 is the nonoperating region. Accordingly, the relay operates when the difference between $\dot{I}_A$ and $\dot{I}_B$ is more than the setting value $I_S$. On the other hand, in case a current as shown by $\dot{I}_B$ in FIG. 3 which is substantially equal in the scalar magnitude to $\dot{I}_A$ and has a phase opposite to the phase of $\dot{I}_A$ flows into the power transmission line, that is, when substantially equal currents whose difference in the magnitude is less than $I_S$ flow into the point $F_1$ in FIG. 1 from opposite directions due to an internal fault, the relay is nonoperative in spite of the fact that protection must be provided. Such a fault can be remedied by additionally affixing the function of the carrier relay of the phase comparison type to the relaying system. As is well known, the carrier relay of the phase comparison type is so designed as to operate when the vector $\dot{I}_B$ is displaced from the vector $\dot{I}_A$ by more than a predetermined phase difference $\Phi$(setting value), that is, when the phase difference between $\dot{I}_A$ and $\dot{I}_B$ is more than a predetermined limit, independently of the absolute values of $\dot{I}_A$ and $\dot{I}_B$. Taking $\dot{I}_A$ as the reference in FIG. 3, the relay operates only on the sides beyond the lines 0—3 and 0—4 where the phase difference is more than $\Phi$. In accordance with the present invention, the relay can have a characteristic substantially comparable to that of a pilot wire relay which does not operate in a bandlike region defined by the area 5-6-7-8 in FIG. 3 and operates in the remaining region.

Figure 4:
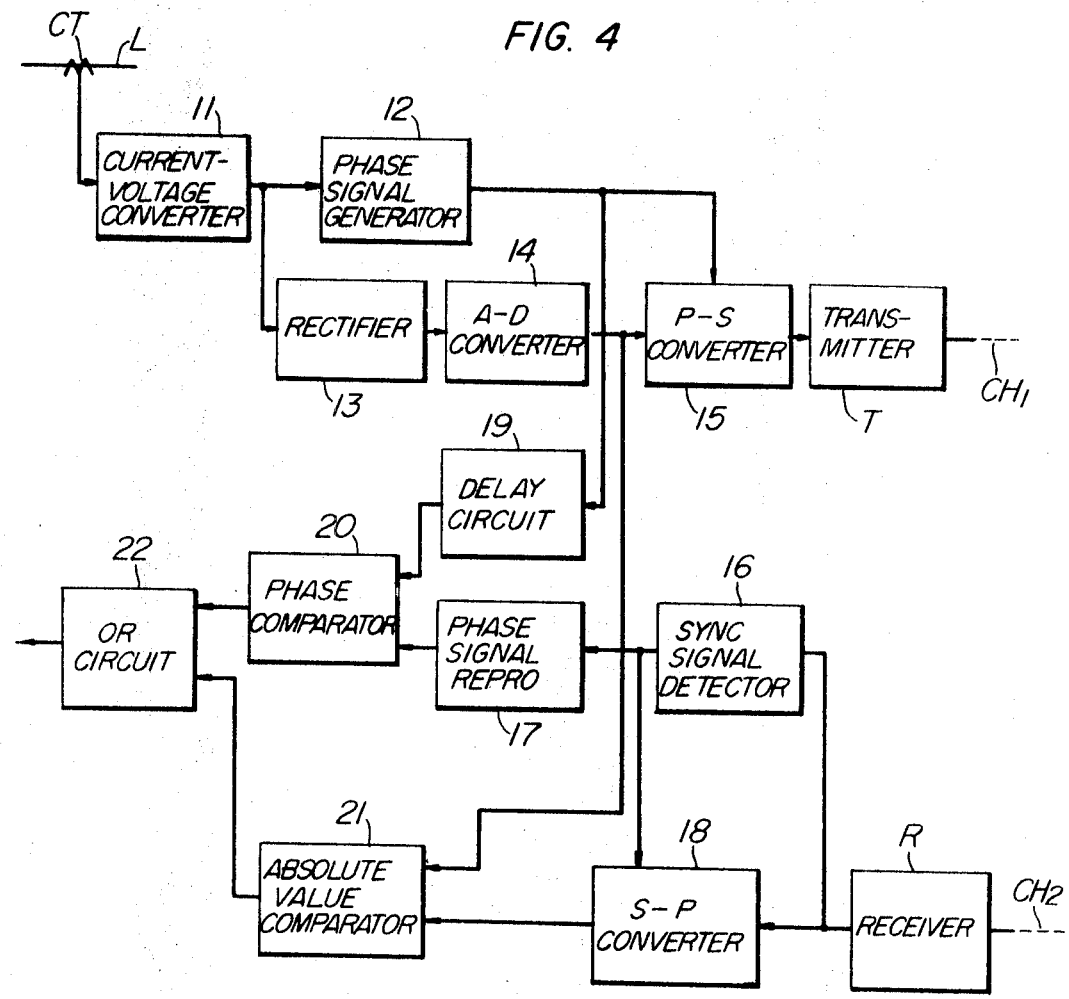
FIG. 4 is a block diagram illustrating the basic idea of the present invention.

FIG. 4 is a block diagram illustrating the basic idea of the present invention and shows an arrangement of elements in an electrical station. It will be understood that a similar arrangement is provided in the opposite or corresponding electrical station. The current flowing through a power transmission line L is detected by a current transformer CT. A current-voltage converter 11 is connected with the secondary circuit of the current transformer CT to generate a voltage corresponding to the phase and magnitude of the current flowing through the power transmission line L. A phase signal generator 12 is connected with the current-voltage converter 11 so that the output from the converter 11 is supplied to the phase signal generator 12. Thus, the phase signal generator 12 generates an output at a specific point of the current waveform, for example, at the point at which the current waveform shifts from negative to positive or from positive to negative or at each of these points. A rectifier 13 is connected with the current-voltage converter 11 so that the output from the converter 11 is supplied to the rectifier 13. Thus, the rectifier 13 generates an output which is proportional to the absolute value of the current. An analog-digital converter 14 (hereinafter to be referred to as A-D converter) converts the output from the rectifier 13 into a digital signal. A parallel-series converter 15 (hereinafter to be referred to as P-S converter) is actuated by the output from the phase signal generator 12 so that the digital code supplied from the A - D converter 14 is combined with the synchronous signal to provide a series signal or a train of pulse signals to be delivered from the converter 15. A transmitter T sends out the pulse train (series signal) supplied from the converter 15 to the receiving end of the opposite station by way of a transmission link $CH_1$.

A receiver R receives a series signal transmitted from the opposite station by way of a transmission link $Ch_2$. A synchronous signal detector 16 detects the synchronous signal in the received-series signal. A phase signal reproducer 17 reproduces the phase signal from the synchronous signal detected by the detector 16. A series-parallel converter 18 (hereinafter to be referred to as S-P converter) is controlled by the output from the detector 16 to convert the series signal thus transmitted into a parallel signal representative of the current in the opposite station. A delay circuit 19 is operative to delay the phase signal of the own station supplied from the phase signal generator 12 by a period which corresponds to the delay in the signal transmitted from the opposite station. The phase signal of the own station and the phase signal of the opposite station are supplied to a phase comparator 20 which generates an output when the phase difference therebetween exceeds a predetermined setting value $\Phi$. An absolute value comparator 21 compares the parallel signal supplied from the A-D converter 14 in the own station with the parallel signal of the opposite station supplied from the converter 18 and generates an output when the difference between the absolute values exceeds a predetermined setting value $I_S$. The comparators 20 and 21 are connected with an OR circuit 22 so that the OR circuit 22 generates an output when one of the comparators 20 and 21 delivers its output.

It will be apparent from the above description that the signal transmitted to the opposite station may only represent the scalar quantity of the current, and the phase signal is transmitted simultaneously in the form of, for example, a point of time of occurrence of a synchronous signal. Therefore, the magnitudes and phases of the currents in two electrical stations can simultaneously be compared with each other, and it is possible to realize a carrier relay having a characteristic which is comparable to that of a pilot wire relay as shown in FIG. 3.

In the practice of the present invention, it is necessary that the scalar quantities representing the currents $i_A$ and $i_B$ vary in quick response to a variation in the currents. To this end, a rectifier circuit which is commonly known as a quick-response rectifier circuit may desirably be employed so that the output from the converter 11 may once be converted into two AC voltages which differ in phase from each other and these AC voltages may be superimposed together.

Figure 5:
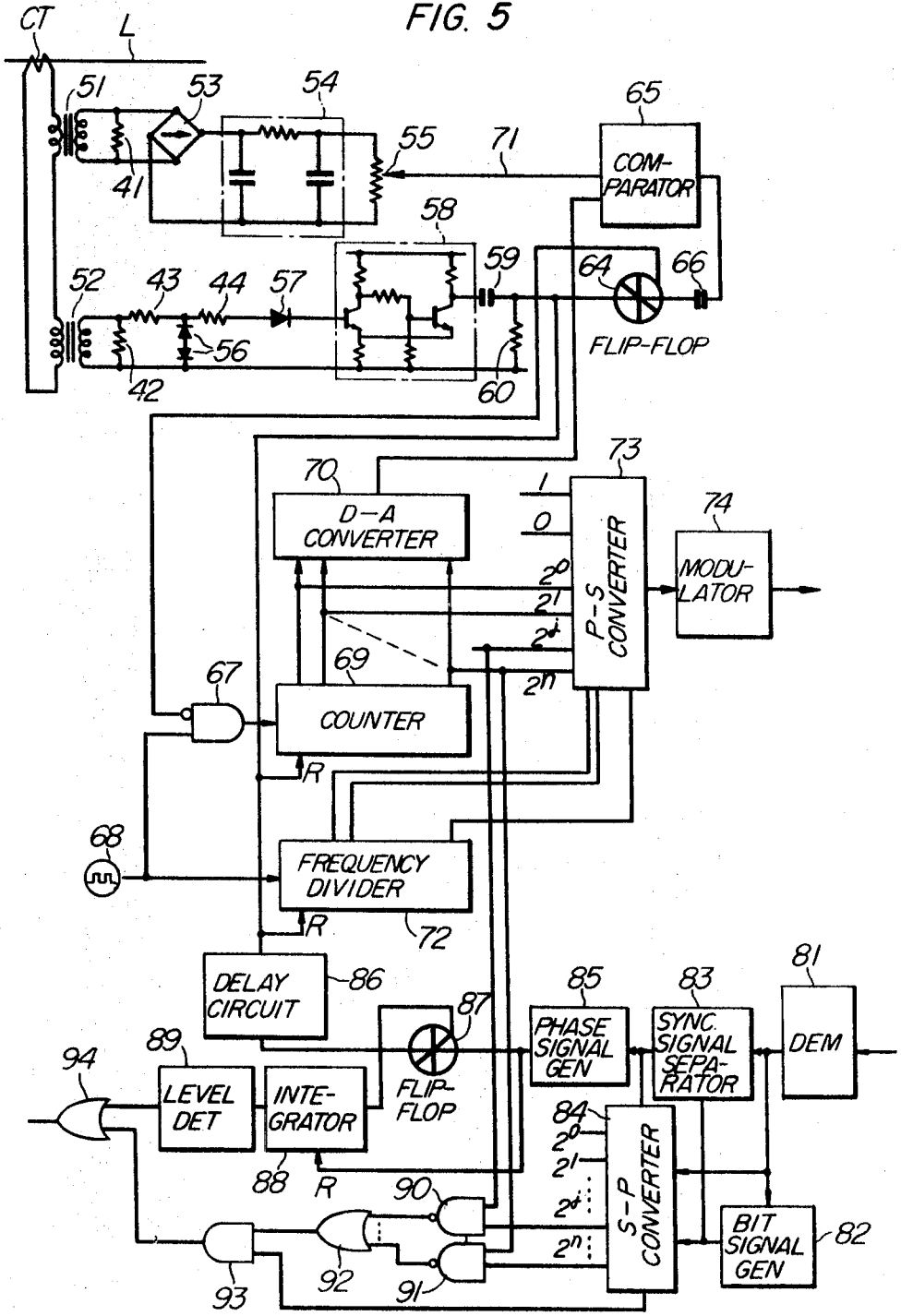
FIG. 5 is a block diagram illustrating an embodiment of the present invention.

FIG. 5 is a block diagram illustrating an embodiment of the present invention. The current flowing through a power transmission line L is detected by a current transformer CT. Auxiliary current transformers 51 and 52 are connected to the secondary circuit of the current transformer CT. A rectifier 53, a filter 54 and a potentiometer 55 are connected to the secondary winding of the auxiliary transformer 51. Zener diodes 56 are provided to slice the output voltage of the auxiliary current transformer 52 at a predetermined level. The Zener diodes 56 are connected through a reverse-current blocking diode 57 with a Schmitt circuit 58 well known in the art. A capacitor 59 and a resistor 60 are provided to differentiate the output from the Schmitt circuit 58. Reference numerals 41, 42, 43 and 44 designate resistors. It will thus be understood that a voltage proportional to the current flowing through the power transmission line L appears in the potentiometer 55, and a pulse output appears across the resistor 60 when, for example, the current varies from negative to positive.

A flip-flop circuit 64 is reset each time the pulse output is supplied from the resistor 60, and is set when an output is supplied from a comparator 65 through a capacitor 66. A clock pulse generator 68 is connected to an inhibit gate 67. The inhibit input to the inhibit gate 67 is supplied from the flip-flop circuit 64 during the period in which the latter is in its set state. A counter 69 containing therein flip-flop of $n$ bits counts the number of clock pulses passed through the gate 67 and is reset when the pulse output is supplied from the resistor 60. A digital-analog converter 70 (hereinafter to be referred to as D-A converter) delivers an analog output corresponding to the output from the counter 69. The sliding arm 71 of the potentiometer 55 and the D-A converter 70 are connected with the comparator 65 so that the comparator 65 delivers an output when the output from the D-A converter 70 coincides with the output from the sliding arm 71. Thus, the operation of the counter 69 is such that it is reset immediately when the current varies from negative to positive and immediately starts its counting operation repeatedly, while it ceases to count when the output from the D-A converter 70 equals the output from the sliding arm 71 of the potentiometer 55. The counting operation by the counter 69 is carried out in a very short time when the frequency of the clock pulse generator 68 is set at several ten kilohertz to several hundred kilohertz. In other words, the mean value of the current flowing through the power transmission line is sampled to be converted into a digital quantity when the current varies from negative to positive.

A frequency divider 72 containing many flip-flops therein is provided to give a series code. The frequency divider 72 counts the number of clock pulses delivered from the clock pulse generator 68, like the counter 69, and is reset when the pulse output is supplied from the resistor 60. Thus, the frequency divider 72 starts to count again each time the current flowing through the power transmission line varies from negative to positive. The outputs from the respective bits of the counter 69, the output from the frequency divider 72 and an additional signal as shown by "1" and "0" in FIG. 5 for producing a synchronous signal are supplied to a parallel-series converter 73 (hereinafter to be referred to as P-S converter). Thus, the P-S converter 73 combines these inputs to provide a series signal including the synchronous signal and succeeding signals. A modulator 74 of a well-known structure modulates the series signal delivered from the P-S converter 73 into a waveform suitable for the transmission by way of a transmission link.

It will be apparent from the above description that the frequency divider 72 is reset each time the current flowing through the power transmission line varies from negative to positive to repeat the frequency dividing operation. Thus, the 72 is reset to repeat the frequency dividing operation. Detection of a point of time of occurrence of the synchronous signal contained in a composite signal transmitted from the opposite station is equivalent to detection of the phase of the current flowing through the power transmission line at the opposite station.

Now, the relation between the electrical station under consideration and the opposite corresponding station will be discussed. A demodulator 81 demodulates the composite signal transmitted from the opposite station to derive the desired signal therefrom. A bit signal generator 82 such as, for example, a well-known phase-locked oscillator is connected with the demodulator 81. A synchronous signal separator 83 delivers an output when the synchronous signal is detected from the received signal. A series-parallel converter 84 (hereinafter to be referred to as S-P converter) acts to convert the received series signal into a parallel signal taking the detected synchronous signal as reference. A phase signal generator 85 receives the output delivered from the synchronous signal separator 83 and produces a signal which is dependent upon the phase of the current flowing through the power transmission line at the opposite station. A delay circuit 86 acts to delay the output pulse delivered from the resistor 60 by a predetermined period. The phase signal generator 85 and the delay circuit 86 are set to have such a relation therebetween that, when the currents $I_A$ and $I_B$ in FIG. 1 have entirely the same phase, the delay circuit 86 delivers its output faster than the phase signal generator 85 by a period which corresponds to the phase difference $\Phi$ shown in FIG. 3.

A flip-flop circuit 87 is set by the output from the delay circuit 86 and is reset by the output from the phase signal generator 85. During the period in which the flip-flop circuit 87 is set, a predetermined input voltage is applied to an integrator 88 to be integrated thereby. The integrator 88 is reset by the output from the phase signal generator 85. A level detector 89 delivers an output when the output from the integrator 88 reaches a predetermined level. The integrating speed of the integrator 88 and the detecting level of the level detector 89 are set so that the level detector 89 delivers its output when the output from the phase signal generator 85 and the output from the delay circuit 86 have a difference in period therebetween which is more than 2$\Phi$ as shown in FIG. 3. NAND circuits 90 and 91 are supplied with the outputs from the counter 69 ranging from the $j$th bit to the $n$th bit and the outputs from the S-P converter 84 ranging from the $j$th bit to the $n$th bit. The NAND circuits 90 and 91 do not deliver any output when both these inputs are applied thereto, but deliver an output when one of the inputs is solely applied thereto. An OR circuit 92 delivers an output when an input is applied thereto from one of the NAND circuits 90 and 91. An AND circuit 93 delivers an output when the OR circuit 92 delivers its output and a timing signal T is supplied from the S-P converter 84. The timing signal T is delivered after the received-series signal has been converted into the parallel signal in the P-S converter 84 taking the signal supplied from the synchronous signal separator 83 as the reference. Therefore, delivery of an output from the AND circuit 93 means that the magnitude of the current detected at the own station and the magnitude of the current detected at the opposite station have a difference therebetween which is more than a setting value. An OR circuit 94 delivers an output when any one of both the level detector 89 and the AND circuit 93 delivers its output.

It will be appreciated from the above description that the present invention realizes a carrier pilot relaying system of simple circuitry. The present invention is in no way limited to the embodiments described above and many changes and modifications may be made therein. For example, while the counter 69 in the above description is adapted to deliver all the outputs corresponding to $n$ bits and all of these outputs are arranged to be transmitted, the outputs ranging from the $j$th bit to the $n$th bit may be arranged to be transmitted. Furthermore, the signal may be transmitted every half cycle in order to obtain an operation at higher speeds in lieu of transmitting the signal every one cycle. It will be understood further that the scalar quantities may be converted into analog quantities which may then be compared with each other.

We claim:
1. A carrier pilot relaying system for protecting power circuits including two power stations which are connected through a power transmission line by comparing a first and a second information signal respectively representative of line currents carried through said transmission line at said two power stations comprising:
    means for producing a current signal having scalar and phase components corresponding to the magnitude and phase of said line current at one of said power stations;
    means for producing a first scalar signal from said current signal;
    means for producing a first phase signal from said current signal;
    means for encoding said first scalar signal and transmitting said encoded first scalar signal in combination with said first phase signal to the other of said power stations as the first information signal;
    means for separating a second scalar signal and a second phase signal from the second information signal transmitted from said other power station and received at said first power station;
    means for comparing said first scalar signal with said second scalar signal, and
    means for comparing said first phase signal with said second phase signal;
    whereby said power circuit may be protected when predetermined conditions within said power transmission line are encountered.

2. A carrier pilot relaying system according to claim 1, wherein said means for comparing said first phase signal with said second phase signal includes means for advancing the phase of said second phase signal by a predetermined phase angle from the phase angle corresponding to said first phase signal.

3. A carrier pilot relaying system according to claim 1, further including means for generating, as one component of said information signal, a part of said encoded scalar signal representing an excess of a predetermined value thereof for transmission to the other power station.

4. A carrier pilot relaying system according to claim 1 including means for effecting the transmission and comparison of said scalar signal and said phase signals periodically each half cycle of said current signal.

5. A carrier pilot relaying system according to claim 1, wherein said means for producing said first phase-signal includes means for generating a signal sequence produced at a predetermined phase angle in each cycle of said current signal.

6. A carrier pilot relaying system according to claim 1, further including means for converting an encoded second scalar signal transmitted from said other power station into an analog signal to be compared with said first scalar signal.

7. A carrier pilot relaying system according to claim 1, wherein said means for producing said current signal comprises:
    a current transformer disposed in said power transmission line and a first auxiliary transformer and a second auxiliary transformer connected in series with the secondary winding of said current transformer; and
    wherein said means for producing a first scalar signal includes a first circuit connected to the output of said first auxiliary transformer for generating a first DC voltage; and
said means for producing said first phase signal comprises a second circuit connected to the output of said second auxiliary transformer for generating a signal representative of a predetermined phase of the current flowing through said power transmission line.

8. A carrier pilot relaying system according to claim 7, wherein said encoding means including means, responsive to said first phase signal, for generating a series of digital signals;
   a digital-to-analog converter connected to the output of said digital signal generating means for producing an analog signal representative of the analog value of the digital signals;
   a comparator circuit for comparing said analog signal and said first scalar signal; and
   a first bistable switching circuit responsive to said first phase signal and the output of said comparator circuit for controlling said digital-signal-generating means;
   whereby said encoding is dependent upon both the phase and scalar signal portions of said current signal.

9. A carrier pilot relaying system according to claim 8, wherein said encoding means further includes a parallel-series converter, responsive to the output of said digital-signal-generating means, for converting said digital signals into series form for application to said transmitting means.

10. A carrier pilot relaying system according to claim 9, wherein said means for generating said series of digital signals includes:
   a source of clock pulses;
   a first gating circuit connected to the output of said clock pulse source and to said first bistable switching circuit for gating said clock pulses in response to a predetermined condition of said bistable switching circuit;
   a counter circuit for counting the signals passed by said first gating circuit and providing parallel output signals to said digital-to-analog converter;
   a frequency divider responsive to said source of a clock pulses for controlling the operation of said parallel-series converter; and
   means for resetting said counter circuit and said frequency divider in response to a predetermined condition of said first phase signal.

11. A carrier pilot relaying system according to claim 10, wherein said separating means includes:
   a demodulator circuit for demodulating said second information signal received from said other power station;
   a synchronous signal separator circuit and a bit signal generator connected to the output of said demodulator circuit;
   a phase signal generator circuit connected to the output of said synchronous signal separator for providing said second phase signal; and
   a series-parallel converter connected to the output of said demodulator circuit and said bit signal generator for providing said second scalar signal in parallel form.

12. A carrier pilot relaying system according to claim 11, wherein said means for comparing means for said first phase signal with said second phase signal comprises a second bistable switching circuit responsive to the output of said phase signal generator and said resetting means;
   an integrated circuit connected to the output of said second bistable switching circuit and controlled by said phase signal generator; and
   a level detecting circuit for providing an output signal when the output of said integrator reaches a predetermined magnitude.

13. A carrier pilot relaying system according to claim 12, wherein said means for comparing said first scalar signal with said second scalar signal comprises a logic circuit responsive to the output of said counter circuit and said series parallel converter for providing an output when said first and second scalar signals have a difference therebetween which is more than a predetermined value.

14. A carrier pilot relaying system according to claim 12, further including means responsive to said resetting means for delaying the signal provided by said resetting means by a predetermined phase angle with respect to said first phase signal, so as to compensate for the delay time of transmission between said power stations.